United States Patent Office 3,341,255
Patented Sept. 12, 1967

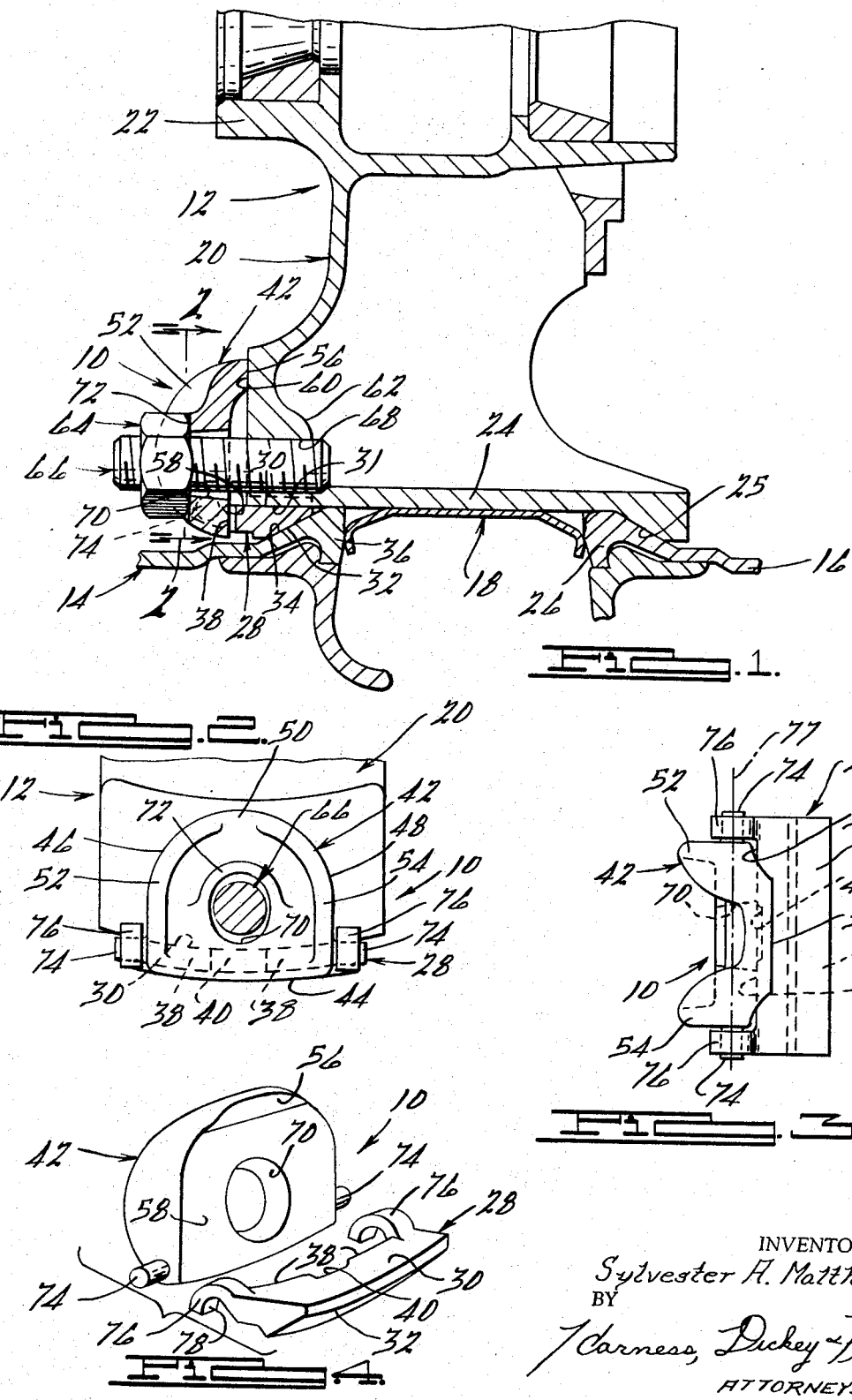

3,341,255
RIM CLAMP
Sylvester A. Malthaner, Rockford, Ill., assignor to Kelsey-Hayes Company, Romulus, Mich., a corporation of Delaware
Filed July 22, 1965, Ser. No. 473,972
4 Claims. (Cl. 301—12)

This invention relates generally to clamping devices for rim and wheel assemblies and, more particularly, to a new improved rim clamp for use in detachably or demountably securing wheel rims of the type used on vehicles such as trucks, tractors, trailers and the like.

In general, the improved rim clamp of the present invention comprises two members, namely, a lever member which is adapted to be mounted radially on a wheel and a wedging member which is adapted to be positioned axially with respect to the wheel. More particularly, the wedging member is positioned between the mounting flange of the outer rim and the wheel felloe and is adapted to be wedged into its operative position by tightening the lever member on to the wheel by means of a suitable bolt, stud, or the like. In accordance with the principles of the present invention, the lever member is formed with a pair of outwardly extending projections or lugs which are adapted to be engaged by a pair of generally hook-shaped fingers that are formed on the opposite ends of the wedging member. The aforesaid projections and fingers serve the twofold purpose of preventing the wedging member from moving circumferentially from its operative position relative to the lever member and also to permit the wedging member to be pulled axially outwardly from its operative position by the lever member upon disassembly of the wheel and associated rim, thereby reducing rim replacement time and effort to a minimum.

It is accordingly a general object of the present invention to provide a new and improved two-piece rim clamp assembly of the above character.

It is another object of the present invention to provide a new and improved two-piece rim clamp assembly of the above character which is adapted to facilitate assembly and disassembly of wheels and their associated wheel rims.

It is a more particular object of the present invention to provide a new and improved two-piece rim clamp assembly wherein the two members are hookingly engaged with one another such that one of the members is adapted to pull the other of the members out of engagement with the wheel and wheel rim whereby to facilitate rapid disassembly thereof.

It is still another object of the present invention to provide a new and improved rim clamp assembly of the above character which is designed so as to prevent any relative circumferential movement between the component members thereof.

It is a further object of the present invention to provide a new and improved rim clamp assembly of the above character which is of a simple design, easy to assemble and economical to commercially manufacture.

Other objects and advantages of the present invention will become apparent from the following detailed description, taken in conjunction with the accompanying drawings, wherein:

FIGURE 1 is a longitudinal cross-sectional view of the improved two-piece rim clamp assembly of the present invention, as shown in operative association with a dual rim wheel assembly;

FIGURE 2 is a side elevational view of the rim clamp assembly of the present invention, taken substantially along the line 2—2 of FIGURE 1;

FIGURE 3 is a top elevational view of the two-piece rim clamp assembly of the present invention; and FIGURE 4 is an enlarged exploded assembly view of the rim clamp assembly of the present invention.

Referring now to the drawing, a rim clamp assembly 10, constructed in accordance with an exemplary embodiment of the present invention, is shown in operative association with a vehicle wheel 12 of the type commonly found on vehicles such as trucks, tractors, trailers and the like, and which includes interchangeable inner and outer wheel rims 14 and 16, respectively, that are separated by a spacing ring 18. The wheel 12 may include any desired number of spoke sections, one of which is illustrated herein and designated by the numeral 20, that extend radially between a central hub section 22 and a wheel felloe section 24 defining a tapered or beveled rim mounting surface 25 upon which an inclined mounting flange 26 of the rim 16 is slidably seated. The rim clamp assembly 10 of the present invention includes a wedge member, generally designated 28, which is of a generally arcuate or circular configuration to conform with the shape of the wheel felloe 24 and rim 14. The radially inner side of the wedge member 28 defines a cylindrical surface portion 30 that is adapted to slidably and contiguously engage the radially outer surface 31 of the wheel felloe section 24. The axially inner end of the wedge member's radially outer side defines a tapered or conical surface 32 that is beveled at an angle of approximately 28° relative to the surface portion 30 for wedging engagement with a complementary shaped surface 34 defined by an inclined mounting flange section 36 of the rim 14. The axially outer end of the wedge member 28 defines a pair of face portions 38 between which a relieved medial portion 40 is formed, as best seen in FIGURE 3.

The wedge member 28 is adapted to be forced or wedged between the adjacent surface portions 31 and 34 by means of a clamping member, generally designated 42 and constituting the second of the two component members of the rim clamp assembly 10. As best seen in FIGURE 2, the clamping member 42 is of a generally semicircular configuration and defines a lower edge 44, and upwardly extending, arcuately shaped side edges 46 and 48 that converge at an apex section 50. The axially outer side of the clamping member 42 is formed with a pair of integral strengthening or reinforcing rib portions 52 and 54 which, as best seen in FIGURES 2 and 3, extend axially outwardly from and conform to the general conformation of the side edges 46 and 48, respectively. The axially inner side of the clamping member 42 is formed with a pair of radially directed face portions 56 and 58, the former of which is located adjacent the apex section 50 and is adapted to abut against a radially directed surface portion 60 defined by an axially outer surface of a boss portion 62 located on the radially outer end of the spoke 20. The radially directed face portion 58 is adapted to be urged into engagement with the face portions 38 formed on the axially outer end of the wedge member 28 upon appropriate adjustment of a nut 64 on an externally threaded stud member 66 which has its axially inner end threaded within a suitable bore 68 formed in the boss portion 62. As best seen in FIGURES 1 and 2, the axially outer end of the stud member 66 extends through a generally oval or oblate shaped opening 70 that is formed in a central portion of the clamping member 42, the opening 70 preferably being sufficiently large to permit limited radial and circumferential adjustment of the clamping member 42 relative to the stud member 66.

The axially outer surface of the clamping member 42 circumjacent the opening 70 is preferably flat or planar, as seen at 72 in FIGURES 1 and 2, to provide a bearing surface for the axially inner side of the nut 64. It will be seen that upon tightening the nut 64 on the stud member 66, the wedge member 28 will be forced axially inwardly to rigidly clamp the rim members 14 and 16 upon the wheel 12, and upon loosening the nut 64 on the stud 66, the force exerted on the rim members 14 and 16 by the wedge member 28 will be relieved to facilitate disassembly of the rims 14 and 16 from the wheel 12.

In accordance with the principles of the present invention, means in the form of a pair of circumferentially extending lugs 74 and a pair of cooperable fingers 76 are integrally formed on the members 42 and 28, respectively, for facilitating removal of the wedge member 28 from between the adjacent surface portions 31 and 34 upon disassembly of the rim members 14 and 16 from the wheel 12. More particularly and as best illustrated in FIGURE 3, the lugs 74, which are preferably cylindrical in shape, are integrally formed on and extend outwardly from the lower ends of the clamping member side edges 46 and 48, the lugs 74 preferably being axially oriented with one another whereby to define a pivotal axis indicated by the phantom line 77 in FIGURE 3. The lugs 74 are adapted to be nested one within each of the fingers 76 which project axially outwardly from and are integrally formed on the axially outer side of the wedge member 28 at the outer ends of the surface portions 38. The fingers 76 are preferably semicircular in shape and are formed with inner surfaces 78 which are defined by radial dimensions slightly larger than the radii of the lugs 74 whereby relatively free pivotal movement is provided between the clamping member 42 and wedge member 28 when the lugs 74 are disposed within the fingers 76.

It will be seen from the foregoing description of the present invention that when it is desired to remove the rim clamp assembly 10 from the wheel 12 to facilitate disassembly thereof, the nut 64 is initially removed from the stud 66, at which time the clamping plate 42 may be removed from the wheel 12 by prying it with a screwdriver, tire iron or similar tool axially outwardly away from the surface portion 60. By virtue of the fact that the lug members 74 of the clamping member 42 are nested within the semicircular finger members 76 of the wedge members 28, as the member 42 is forced axially outwardly, the wedge member 28 will be simultaneously pulled axially outwardly from between the surface portions 31 and 34 to permit the rim members 14 and 16 to be disassembled from the radially outer end of the spoke 20. It may be noted that it is frequently only necessary to strike the clamping member 42 with an object, i.e., screwdriver, tire iron or siminal tool axially outwardly away be sufficiently loosened to permit it to be removed manually from between the surface portions 31 and 34 as the member 42 is moved axially off of the stud 66. It will be seen, therefore, that through the provision of the lugs 74 and fingers 76 on the members 42 and 28, respectively, the members 42 and 28 may be disassembled simultaneously instead of individually as was the case in heretofore known and used rim clamps. Accordingly, the rim clamp 10 of the present invention will reduce rim replacement time and effort to a minimum.

It may be noted that together with facilitating rapid disassembly of the wedge member 28, as above described, the lugs 74 and fingers 76 integrally formed on the clamping member 42 and wedge member 28, respectively, function to preclude any relative circumferential movement between the clamping member 42 and wedge member 28, thereby insuring that the wedge member 28 will not move from its operative position between the surfaces 30 and 34.

While it will be apparent that the exemplary embodiment illustrated herein is well calculated to fulfill the objects above stated, it will be appreciated that the rim clamp assembly 10 of the present invention is susceptible to modification, variation and change without departing from a proper scope or fair meaning of the subjoined claims.

What is claimed is:

1. In combination with a vehicle wheel and wheel rim adapted to be detachably secured thereto,
a rim clamp assembly comprising a first member and second clamping member for securing the wheel rim on the wheel,
said first member being wedge shaped in transverse section and inserted between adjacent portions of the wheel and wheel rim,
said second clamping member having an opening therein adapted to receive a stud on the wheel whereby a nut threaded on the stud can be adjusted to urge said second member against said first member so that said first member is forced between the adjacent portions of the wheel and wheel rim, said clamping member having a radially outer portion pivotally contacting said wedge shaped member whereby said members are pivotable about an axis generally tranverse to the axis of said wheel, and
finger means secured to one of said members and adapted to pivotally engage a portion of the other of said members such that an axial force applied to said second member will be transmitted to said first member through said means whereby said first member will be biased from between the adjacent portions of said wheel and said wheel rim as said second member is moved axially outwardly from said wheel.

2. In combination with a vehicle wheel and wheel rim adapted to be detachably secured thereto,
a rim clamp assembly comprising first and second members for securing the wheel rim on the wheel,
said first member being wedge shaped in transverse section and inserted between adjacent portions of the wheel and wheel rim,
said second member having an opening therein adapted to receive a stud on the wheel whereby a nut threaded on the stud can be adjusted to urge said second member against said first member so that said first member is forced between the adjacent portions of said wheel and wheel rim, and
a pair of arcuately shaped finger portions integrally formed on each end of one of said members and engageable with a pair of outwardly extending projections formed on the other of said members such that an axial force applied to said second member will be transmitted to said first member through said finger portions and said projections, whereby said first member will be biased from between the adjacent portions of said wheel and said wheel rim as said second member is moved axially outwardly from said wheel.

3. In combination with a vehicle wheel and wheel rim adapted to be detachably secured thereto,
a rim clamp assembly comprising first and second members for securing the wheel rim on the wheel,
said first member being wedge shaped in transverse section and inserted between adjacent portions of the outer periphery of the wheel and the inner periphery of the wheel rim,
said second member having an opening therein adapted to receive a stud on the wheel whereby a nut threaded on the stud can be adjusted to urge said second member against said first member so that said first member is forced between the adjacent portions of the wheel and the wheel rim,
a pair of arcuately shaped finger portions integrally formed at the opposite ends of said first member and extending axially therefrom, and
a pair of circumferentially extending projections integrally formed on the opposite ends of said second member and adapted to be engaged by said finger portions of said first member whereby to pivotally connect said first and second members such that an axial force applied to said second member will be transmitted to said first member through said finger portions and said projections, whereby said first member will be biased from between the adjacent portions of said wheel and said wheel rim as said second member is moved axially outwardly from said wheel.

4. A clamping arrangement for clamping a tire rim having a tapered portion around the inner periphery thereof onto a vehicle wheel having a plurality of rigidly outwardly extending spokes comprising,
- a first member which is generally wedge shaped in transverse section and inserted between the outer end of one of said spokes and the tapered portion of the rim, and
- a clamping member having an aperture therein to fit over a stud on the one spoke whereby a nut threaded on the stud can be adjusted to urge the clamping member tightly against said first member so that said first member is forced between said rim and the spoke,
- said clamping member having a first face portion engageable with the spoke and the second face portion engageable with the wedge member,
- said clamping member also having a pair of axially outwardly projected reinforcing ribs and a pair of circumferentially outwardly extending projections integrally formed thereon,
- said first member being formed with a pair of semicircular shaped finger portions adapted to be hooked over said projections of said clamping member whereby to pivotably connect said first member and said clamping member to one another, whereby an axial force applied to said clamping member will pull said first member from between the spoke and the rim to facilitate disassembly thereof.

References Cited

UNITED STATES PATENTS

| | | | |
|---|---|---|---|
| 1,233,465 | 7/1917 | Harris | 301—124 X |
| 2,164,772 | 7/1939 | Keller. | |
| 3,007,741 | 11/1961 | Brown | 301—13 |
| 3,013,842 | 12/1961 | Walther | 301—20 |
| 3,199,920 | 8/1965 | Hurst | 301—20 X |

BENJAMIN HERSH, *Primary Examiner.*

RICHARD J. JOHNSON, *Examiner.*

UNITED STATES PATENT OFFICE
CERTIFICATE OF CORRECTION

Patent No. 3,341,255                                September 12, 1967

Sylvester A. Malthaner

It is hereby certified that error appears in the above numbered patent requiring correction and that the said Letters Patent should read as corrected below.

Column 3, lines 49 to 51, strike out "screwdriver, tire iron or siminal tool axially outwardly away be sufficiently loosened to permit it to be" and insert instead -- screwdriver or the like, whereby the wedge member 28 will be sufficiently loosened to permit it to be --.

Signed and sealed this 22nd day of October 1968.

(SEAL)
Attest:

Edward M. Fletcher, Jr.                            EDWARD J. BRENNER

Attesting Officer                                      Commissioner of Patents